Nov. 26, 1935.　　　　　C. E. HESS　　　　　2,022,466
APPARATUS FOR USE IN THE CUTTING OF LAMINATED GLASS
Filed Jan. 21, 1932
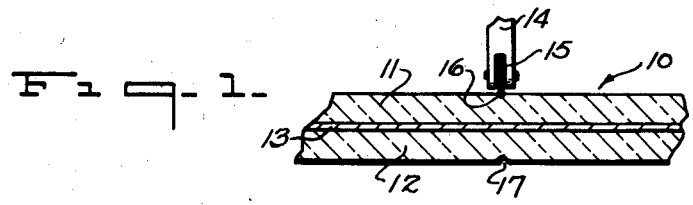
Fig. 1.
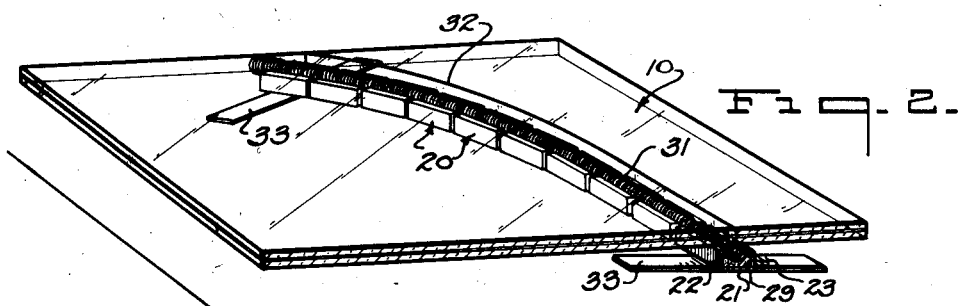
Fig. 2.
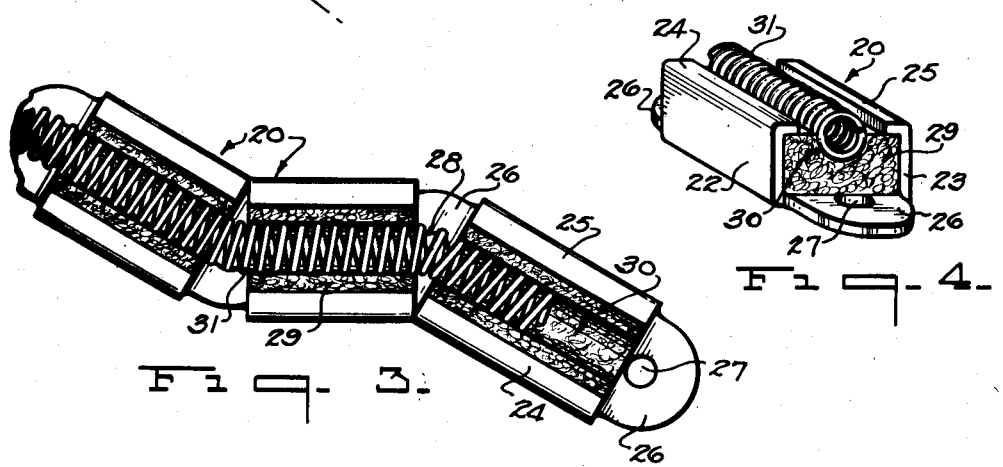
Fig. 3.
Fig. 4.
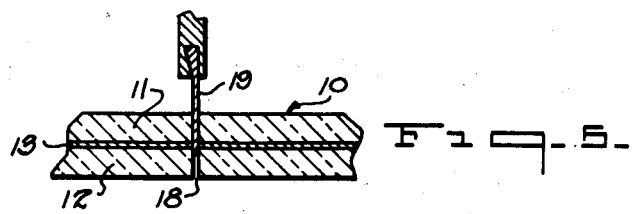
Fig. 5.
INVENTOR
CHARLES E. HESS.
BY
Frank Fraser
ATTORNEY Patented Nov. 26, 1935

2,022,466

UNITED STATES PATENT OFFICE 2,022,466

APPARATUS FOR USE IN THE CUTTING OF LAMINATED GLASS

Charles E. Hess, Chicago, Ill., assignor to Libbey-Owens-Ford Glass Company, Toledo, Ohio, a corporation of Ohio Application January 21, 1932, Serial No. 587,878

8 Claims. (Cl. 219—19)

The present invention relates to an apparatus for use in the cutting of sheets of laminated glass, which glass usually comprises two or more sheets of glass and one or more sheets of a suitable non-brittle material interposed therebetween and united thereto to form a composite structure.

This invention is particularly adapted, although of course not restricted, for use in the cutting of laminated sheet glass in accordance with the general process disclosed in the patent to S. J. Lewis, 1,731,820, issued October 15, 1929, and contemplates the cutting of a sheet of laminated glass by first scoring the sheet upon opposite sides, heating the sheet in proximity to the score lines, separating the glass sheets along the score lines, and then severing the innermost non-brittle sheet by means of a sharp implement or the like.

An important object of the invention resides in the provision of an apparatus of novel and improved design by means of which the heating of the laminated sheet along the score lines or lines of cut may be readily and conveniently effected in a manner to promote rapid and accurate cutting of the glass.

Another object of the invention resides in the provision of heating means of the above character adaptable for use in the heating of a laminated sheet of glass along either straight or curved lines of cut.

A further object of the invention resides in the provision of heating means of the above character comprising a flexible heating unit so constructed that it may be utilized in the heating of laminated sheets having lines of cut of varying curvatures.

Other objects and advantages of the invention will become more apparent during the course of the following description when taken in connection with the accompanying drawing.

In the drawing forming a part of this application and wherein like numerals are employed to designate like parts throughout the same, Fig. 1 is a sectional view of a portion of a sheet of laminated glass illustrating diagrammatically the scoring of the glass sheets.

Fig. 2 is a perspective view of the heating apparatus or unit provided by the present invention and shown in operative relation with respect to a sheet of laminated glass which is to be heated, Fig. 3 is a plan view of a portion of the heating unit, Fig. 4 is a perspective view of one section of the heating unit, and Fig. 5 is a sectional view of a portion of a sheet of laminated glass illustrating diagrammatically the cutting of the non-brittle material after the glass sheets have been separated along the score lines.

In Fig. 1 of the drawing is shown a sheet of laminated glass 10 comprising the two outer sheets of glass 11 and 12 between which is interposed a sheet 13 of some suitable non-brittle material united to the glass sheets to provide a composite structure. It is of course to be understood that the present invention is in no way limited to any particular method of compositing the laminated sheet or to the materials used therein.

In cutting the laminated sheet 10, both sides thereof are first scored, with the two score lines being opposite or in alignment with one another. This may be effected, for example, by means of a scoring tool 14 including a hardened steel wheel 15 which, when drawn across the glass sheets 11 and 12, forms the score lines 16 and 17 opposite one another. Although it is preferred to use an ordinary dull steel wheel cutter in scoring the glass sheets, a diamond cutter could of course be used if preferred.

After the laminated sheet has been scored in the above manner, the glass sheets 11 and 12 are cracked along the score lines 16 and 17, and either one or both of the said glass sheets separated at the score lines to permit access to the non-brittle material. As has been shown in Fig. 5, both of the glass sheets have been separated along the score lines to provide a space or gap 18 therebetween and, after the non-brittle material has been so stretched, a suitable cutting implement 19 may be passed through the space 18 to sever the non-brittle sheet 13, thereby completing the cutting operation.

However, in order to facilitate the stretching of the non-brittle material during the separation of the glass sheets along the line of cut, the laminated sheet after being scored is adapted to be heated along the score lines to soften the non-brittle material. The aim of this invention is the provision of heating means of novel and improved construction for carrying out the heating operation referred to above. While the heating means of the present invention has been designed particularly for use in the heating of laminated sheets of glass along curved lines of cut, it may also be employed for heating along straight lines of cut. Furthermore, due to its flexibility, the heating means herein provided is adaptable for the heating of laminated sheets of glass having lines of cut of varying curvatures.

The apparatus herein provided for heating the laminated sheet comprises a heating unit composed of a plurality of independent sections or supporting members 20 arranged end to end and being pivotally connected together so that they may be moved laterally and angularly with respect to one another as shown in Fig. 3. Each supporting member or section 20 comprises a substantially U-shaped metallic holder or shield having a bottom 21 and opposite side members 22 and 23. The upper edges of the said side members 22 and 23 are preferably turned inwardly to form the flanges 24 and 25 respectively. Each holder is provided at each of its ends with an outwardly projecting ear 26 preferably formed integral with the bottom 21 and having an opening 27 therein. When assembling the heating unit, a desired number of supporting members 20 are arranged end to end with the ears 26 at the adjacent ends of adjoining members overlapping one another and being pivotally connected together by suitable fastening means 28 which pass through the aligned openings 27 in said ears 26. Carried by each metallic holder is an asbestos filler or pad 29 which is held in place by the flanges 24 and 25. The asbestos filler extends throughout the length of the holder and is provided in its exposed surface with a groove or recess 30.

Extending longitudinally of and carried by all of the supporting members 20 and arranged within the recesses 30 in the asbestos fillers 29 is an electric heating element 31, here shown as being in the form of a flexible metallic coil which is adapted to be heated upon the passage of an electric current therethrough. As shown in Figs. 2 and 3, a single coil is adapted to extend throughout the combined length of the several supporting members 20 and is adapted to project above the flanges 24 and 25. The heating coil, when positioned within the recesses, is maintained out of contact with any metallic portion of the supporting members.

As pointed out above, in the cutting of laminated glass, the glass sheets are first scored in the manner illustrated in Fig. 1 and then cracked along the score lines. The sheet is then adapted to be heated in proximity to the score lines so as to soften the non-brittle material, after which the softened non-brittle material is adapted to be stretched to effect the separation of the glass along the lines of cut. The non-brittle material is then severed by a suitable cutting implement such as illustrated in Fig. 5. If the heating unit herein provided is to be used for heating the laminated sheet along a straight line of cut, the supporting members 20 are arranged in alignment with one another so that the heating coil 31 will be straight. However, in the event the heating unit is adapted to be used for heating the laminated sheet along a curved line of cut such as indicated by the numeral 32 in Fig. 2, the individual supporting members 20 are first adjusted relative to one another in such a manner that the heating coil 31 will be bent to assume a curvature corresponding to the curvature of the score line 32. The heating unit is then placed upon a suitable table or other supporting surface, after which the laminated sheet is laid upon the heating coil, with the score line or crack in the lower glass sheet being directly thereabove. In all cases, the individual supporting members are moved relative to one another so that the heating coil will be curved to follow the line of cut, and the heating coil should always be arranged centrally of the crack in the glass. If desired, a suitable number of the supporting members 20 may be provided with feet 33 which will serve to steady the unit when it is placed horizontally upon a supporting surface.

After the heating unit has been properly positioned and the laminated sheet laid thereupon, the heating coil is connected with a suitable source of energy and an electric current passed therethrough whereupon the heating coil will function to cause a heating of the glass sheets and the sheet of non-brittle material. Upon heating of the non-brittle material, it will become softened, and after sufficient softening it can be stretched to permit a separation of the glass sheets along the line of cut so that access may be had to the non-brittle material. Of course, if preferred, the glass sheet can be laid horizontally upon a supporting surface and the heating unit inverted and laid upon the upper sheet of glass. Likewise, the laminated sheet may be heated either before or after the glass sheets have been cracked along the score lines.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. A heating unit adapted to rest upon a substantially flat horizontal supporting surface while in use, including a plurality of supporting members connected together so that they are movable angularly relative to one another in the plane of said supporting surface and while resting thereupon, each member including a holder and an asbestos covering for a portion of said holder, and a heating element carried by said holders in contact with said asbestos covering.

2. A heating unit adapted to rest upon a substantially flat horizontal supporting surface while in use, including a plurality of supporting members pivotally connected together so that they are movable angularly relative to one another in the plane of said supporting surface and while resting thereupon, each member including a holder and an asbestos filler carried thereby, and a flexible heating element carried by said asbestos fillers.

3. A heating unit, including a plurality of substantially rectangular supporting members arranged end to end, means for pivotally connecting said members together so that adjacent members are movable angularly with respect to one another and non-adjacent members both angularly and laterally relative to one another, each of said members including a holder having a substantially flat bottom and spaced upstanding side portions, an asbestos pad received within each holder and supported upon the bottom thereof, each asbestos pad having a channel formed in its upper surface extending longitudinally thereof, and a single electric heating coil extending longitudinally of said supporting members and received within the channels in said asbestos pads, said coil projecting above the upper surfaces of the said pads and also above the said holders.

4. A heating unit adapted to rest upon a substantially flat horizontal supporting surface when in use, including a plurality of supporting members arranged end to end and pivotally connected together so that they are movable angularly relative to one another in the plane of said supporting surface and while resting thereupon, each member including a metallic holder and an asbestos pad carried thereby, and a flexible electric heating element extending longitudinally of the supporting members and carried by said asbestos pads.

5. In an apparatus for applying heat to restricted, predetermined areas extending in varying curvatures, a heating unit including a plurality of substantially rectangular supporting members arranged end to end, means for pivotally connecting said supporting members together so that they are movable angularly relative to one another in the plane of the areas to be heated, each member comprising a metallic holder and a pad of insulating material carried thereby and arranged to form, with adjacent pads, a substantially continuous supporting surface, and a flexible electric heating element extending longitudinally of the supporting members and carried by said pads.

6. In an apparatus for applying heat to restricted, predetermined areas extending in varying curvatures, a heating unit including a plurality of substantially rectangular supporting members arranged end to end, means for pivotally connecting said supporting members together so that they are movable angularly relative to one another in the plane of the areas to be heated, each member comprising a metallic holder and a grooved insulating pad carried thereby and arranged to form, with adjacent pads, a substantially continuous supporting surface, and a flexible electric heating element extending longitudinally of the supporting members and received within the grooves in said pads.

7. In an apparatus for applying heat to restricted, predetermined areas extending in varying curvatures, a heating unit adapted to rest upon a substantially flat, horizontal supporting surface while in use, including a plurality of substantially rectangular supporting members arranged end to end and pivotally connected together so that adjacent members are movable angularly with respect to one another and nonadjacent members both angularly and laterally relative to one another in the plane of said supporting surface and while resting thereupon, each member comprising a metallic holder and a pad of insulating material carried thereby and arranged to form, with adjacent pads, a substantially continuous supporting surface, and a flexible electric heating element extending longitudinally of the supporting members and carried by said pads.

8. In an apparatus for applying heat to restricted, predetermined areas extending in varying curvatures, a heating unit adapted to rest upon a substantially flat, horizontal supporting surface while in use, including a plurality of substantially rectangular supporting members arranged end to end and pivotally connected together so that adjacent members are movable angularly with respect to one another and nonadjacent members both angularly and laterally relative to one another in the plane of said supporting surface and while resting thereupon, each member comprising a metallic holder and a grooved insulating pad carried thereby and arranged to form, with adjacent pads, a substantially continuous supporting surface, and a flexible electric heating element extending longitudinally of the supporting members and received within the grooves in said pad.

CHARLES E. HESS.